United States Patent [19]
Takehara

[11] Patent Number: 5,218,545
[45] Date of Patent: Jun. 8, 1993

[54] SUSPENSION APPARATUS OF AUTOMOTIVE VEHICLE WITH CONTROL SYSTEM HAVING A VARIABLE TIME CONSTANT

[75] Inventor: Shin Takehara, Hiroshima, Japan

[73] Assignee: Mazda Motor Corporation, Hiroshima, Japan

[21] Appl. No.: 621,466

[22] Filed: Dec. 5, 1990

[30] Foreign Application Priority Data

Dec. 5, 1989 [JP] Japan .................................. 1-317109

[51] Int. Cl.$^5$ ........................................... B60G 17/015
[52] U.S. Cl. .................... 364/424.05; 280/707
[58] Field of Search ................... 364/424.05; 280/702, 280/703, 707

[56] References Cited

U.S. PATENT DOCUMENTS

| | | | |
|---|---|---|---|
| 4,897,776 | 1/1990 | Urababa et al. | 364/424.05 |
| 4,903,983 | 2/1990 | Fukushima et al. | 364/424.05 X |
| 4,905,152 | 2/1990 | Kawabata | 364/424.05 |
| 4,953,890 | 9/1990 | Kamimura | 364/424.05 X |

*Primary Examiner*—Parshotam S. Lall
*Assistant Examiner*—Edward Pipala
*Attorney, Agent, or Firm*—Fish & Richardson

[57] ABSTRACT

A suspension apparatus of a vehicle has a liquid cylinder disposed between a member on the side of a vehicle body and a member on the side of each wheel so as to alter a suspension characteristic by controlling the supply and discharge of an operating liquid to and from the liquid cylinder. The gain of the control amount in a high-frequency region for supplying or discharging the operating liquid to or from the operating liquid is reduced by a low pass filter. The time constant of the low pass filter is so arranged as to become larger as the control amount gets larger.

17 Claims, 5 Drawing Sheets

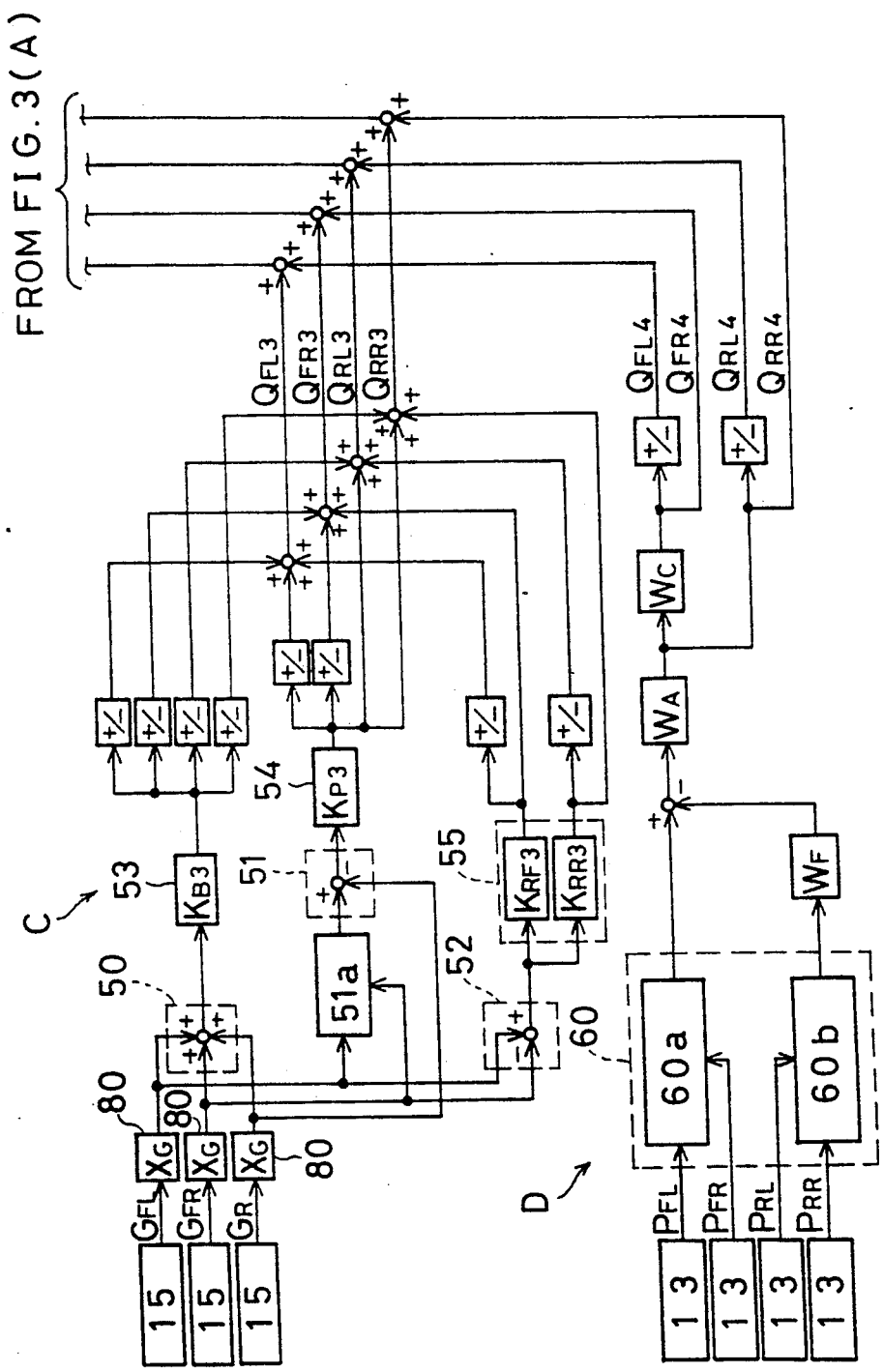

SUSPENSION APPARATUS OF AUTOMOTIVE VEHICLE WITH CONTROL SYSTEM HAVING A VARIABLE TIME CONSTANT

BACKGROUND OF THE INVENTION

1. Field of the Invention

The present invention relates to a suspension apparatus of an automotive vehicle and, more particularly, to a suspension apparatus of an automotive vehicle, which is so arranged as to alter its suspension characteristics by controlling supply or discharge of an operating liquid to or from a liquid pressure chamber of a liquid cylinder disposed between a member on the vehicle body side and a member on each wheel side.

2. Description of Related Art

Heretofore, for example, Japanese Patent Laid-open Publication (kokai) No. 130,418/1988 discloses an active suspension apparatus adapted so as to alter its suspension characteristics by altering the amount of a liquid disposed in a liquid cylinder by controlling the supply or discharge of an operating liquid to or from the liquid cylinder mounted between a member on the vehicle body side and a member on each wheel side in accordance with the running state of the vehicle. This active suspension apparatus has an actuator for carrying out the supply and discharge of the operating liquid to and from the liquid pressure chamber of the liquid cylinder, an acceleration detecting means for detecting acceleration in the vertical direction, or vertical acceleration, of the vehicle body, an integration means for integrating a signal detected by the acceleration detecting means, and a control means for determining a control amount of the actuator for controlling the liquid cylinder by multiplying the output signal generated by the integration means with a predetermined gain coefficient. This active suspension apparatus is arranged such that, for instance, when it is confirmed by signals detected by the acceleration detecting means that the vehicle body is bouncing, the control signal corresponding to the control amount determined by the control means is generated to the actuator, thereby subjecting the amount of the operating liquid to be supplied or discharged to or from the liquid cylinder to a feedback control and consequently reducing the bounce of the vehicle body.

It is to be noted herein, however, that this active suspension apparatus is so arranged as to allow the operating state of the liquid cylinder to vary with the frequency of vibration acting upon the vehicle body, so that a gain of the control amount in a high frequency region is considered to be reduced by inputting the output signal of the control amount determined by the control means through a low pass filter to the actuator. In other words, it is considered that the low pass filter is so arranged as to allow the level of the control signal to be reduced in accordance with an increase in the frequency of vibration by multiplying the control amount with a value expressed by a predetermined time constant T and a Laplace's operator is so set as to increase with an increase in the frequency of vibration, i.e., by $\{1/(1+Ts)\}$. This arrangement permits an appropriate operation of the liquid cylinder by generating a control signal of such a level as corresponding to the control amount and a long-term maintenance of better comfort, when the frequency of vibration acting upon the vehicle body is small, on the one hand. When the frequency of vibration is large, on the other hand, the arrangement further suppresses the liquid cylinder from operating by reducing the level of the control signal and prevents the liquid cylinder to frequently operate followed by the vibration in a high frequency region, thereby avoiding power being wasted.

As described hereinabove, when the operating amount of the liquid cylinder is controlled by generating the control signal to the actuator through the low pass filter, it has been found, however, that the vibration acting upon the vehicle body is so deviated as to become larger upon occurrence of an oscillating phenomenon in a particular high-frequency region due to a delay of response. When the oscillating phenomenon will occur in such a state that the vibration having a large amplitude acts upon the vehicle body, the vibration of the vehicle becomes larger to the contrary, so that comfort is impaired.

SUMMARY OF THE INVENTION

Therefore, the present invention has been performed in order to solve the problems and disadvantages inherent in conventional suspension apparatuses and has the object to provide a suspension apparatus of an automotive vehicle so arranged as to effectively prevent the oscillating phenomenon from occurring when the vibration having a large amplitude acts upon the vehicle body, thereby maintaining better comfort in a favorable state.

In order to achieve the aforesaid objects, the present invention relates to a suspension apparatus of a vehicle having a liquid cylinder disposed between a member on the side of a vehicle body and a member on the side of each wheel and an actuator for supplying or discharging an operating liquid to or from a liquid pressure chamber of the liquid cylinder disposed so as to alter a suspension characteristic by controlling the actuator, comprising:

a running-state detecting means for detecting a running state of the vehicle;

a control means for determining a control amount for the actuator on the basis of a predetermined condition in accordance with a signal detected by and outputted from the running-state detecting means; and a low pass filter for reducing a gain of the control amount determined by the control means in a high frequency region;

wherein a time constant of the low pass filter is so set as to become larger as the control amount determined by the control means gets larger.

For the suspension apparatus according to the present invention, the time constant of the low pass filter is so set as to vary with the control amount determined by the control means. More specifically, the time constant of the low pass filter is so set as to become larger when the control amount becomes larger upon action of the vibration with a large amplitude to the vehicle body, thereby reducing the level of the control signal to be outputted in a high frequency region to a remarkable extent, so that the oscillating phenomenon resulting from a delay of control can effectively be suppressed. When the amplitude of vibration acting upon the vehicle body is smaller, the gain of the control amount in a high frequency region is set to a value higher than when the amplitude thereof is larger, so that the liquid cylinder can be operated rapidly.

Other objects, features and advantages of the present invention will become apparent in the course of the description of the preferred embodiments, which follows, with reference to the accompanying drawings.

DETAILED DESCRIPTION OF THE PREFERRED EMBODIMENTS

The present invention will be described more in detail with reference to the accompanying drawings. In the description which follows, reference symbols "F" and "R" denote front and rear, respectively, so that it is to be understood that, for example, wheels 2F and 2R refer to the wheels 2 located on the front (F) and rear (R) sides, respectively. Further, reference symbols "FL", "FR", "RL", and "RR" denote left-hand front, right-hand front, left-hand rear, and right-hand rear, respectively. It is thus to be understood that, for example, the wheel 2FL refers to the wheel 2 on the left-hand front side and the same can be applied to the rest.

Figure 1:
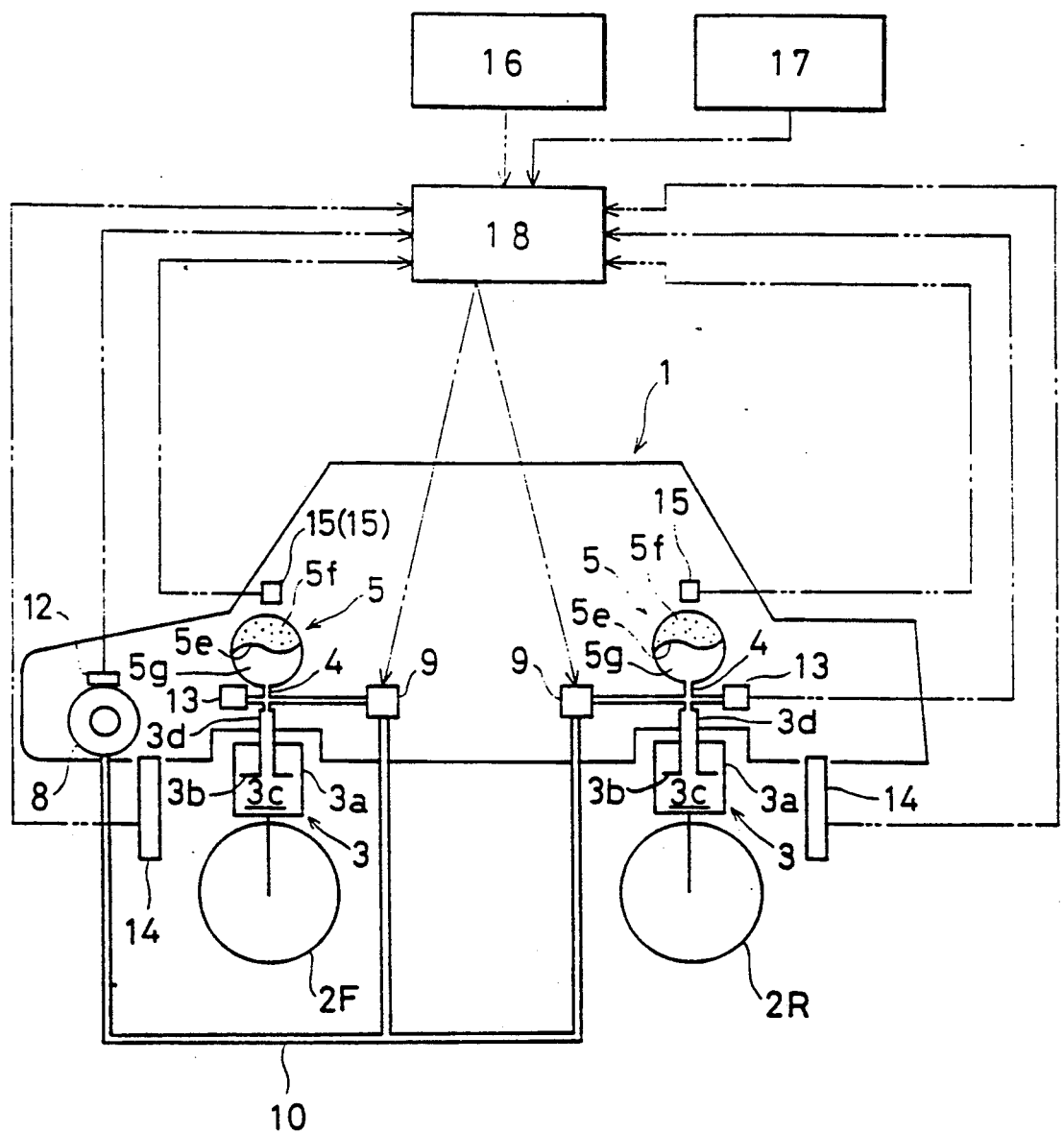
FIG. 1 is a diagrammatic representation of an outline of the construction of the suspension apparatus of an automotive vehicle according to the present invention.

FIG. 1 shows an outline of the construction of a suspension apparatus of the automotive vehicle according to the present invention. As shown in FIG. 1, there is provided a liquid cylinder 3 between a vehicle body 1 and a front wheel 2F and between the vehicle body 1 and a rear wheel 2R each. The liquid cylinder 3 comprises a cylinder body 3a connected at its lower end portion to a member on the wheel side and a piston 3b so inserted into the cylinder body 3a as to form and define a liquid pressure chamber 3c within the cylinder body 3a. On an upper face of the piston 3b is provided a piston rod 3d whose upper end portion is supported by the vehicle body 1.

To the liquid pressure chamber 3c of the liquid cylinder 3 is connected a passage 4 which in turn is communicated with a gas spring 5. The gas spring 5 is divided into a gas chamber 5f and a liquid pressure chamber 5g by a diaphragm 5e, and the liquid pressure chamber 5g is communicated with the liquid pressure 3c of the liquid cylinder 3 through the passage 4 and a passage disposed in the piston 3b of the liquid cylinder 3.

At the front end portion of the vehicle body 1 is disposed a hydraulic pump 8 driveable by an engine (not shown), and the hydraulic pump 8 is communicated with a liquid pressure piping 10 having a flow rate control valve 9 which in turn is so arranged as to adjust the flow rate of the operating liquid by controlling the supply or discharge of the operating liquid to or from the liquid cylinder 3.

The vehicle body 1 is further provided with various sensors including a discharge pressure sensor 12 for sensing the discharge pressure of the hydraulic pump 8, a liquid pressure sensor 13 for sensing the liquid pressure of the liquid pressure chamber 3c of each liquid pressure 3, a vehicle height sensor 14 for sensing an amount of displacement of the vehicle height with respect to each of the respective front and rear wheels 2F and 2R, namely, for sensing a cylinder stroke, a vertical acceleration sensor 15 for sensing a degree of vertical acceleration of the vehicle body, namely, for sensing the spring weight acceleration of the respective front and rear wheels 2F and 2R, a steered angle sensor 16 for sensing the steered angle of the steering wheel, and a vehicle speed sensor 17 for sensing the vehicle speed at which the vehicle body is running. The vertical acceleration sensor 15 is mounted in a position above the left-hand and right-hand front wheels 2F each and in a transversely middle position between the left-hand and right-hand rear wheels 2R.

The signal detected by each of the sensors 12 to 17 is inputted into a controller 18 having a central processing unit (CPU) and so on, and a control signal corresponding to the detected input of the signal is generated from the controller 18 to the flow rate control valve 9, thereby controlling the flow rate of the operating liquid to be supplied to or discharged from the liquid cylinder 3 and consequently carrying out variable control over the suspension characteristics.

Figure 2:
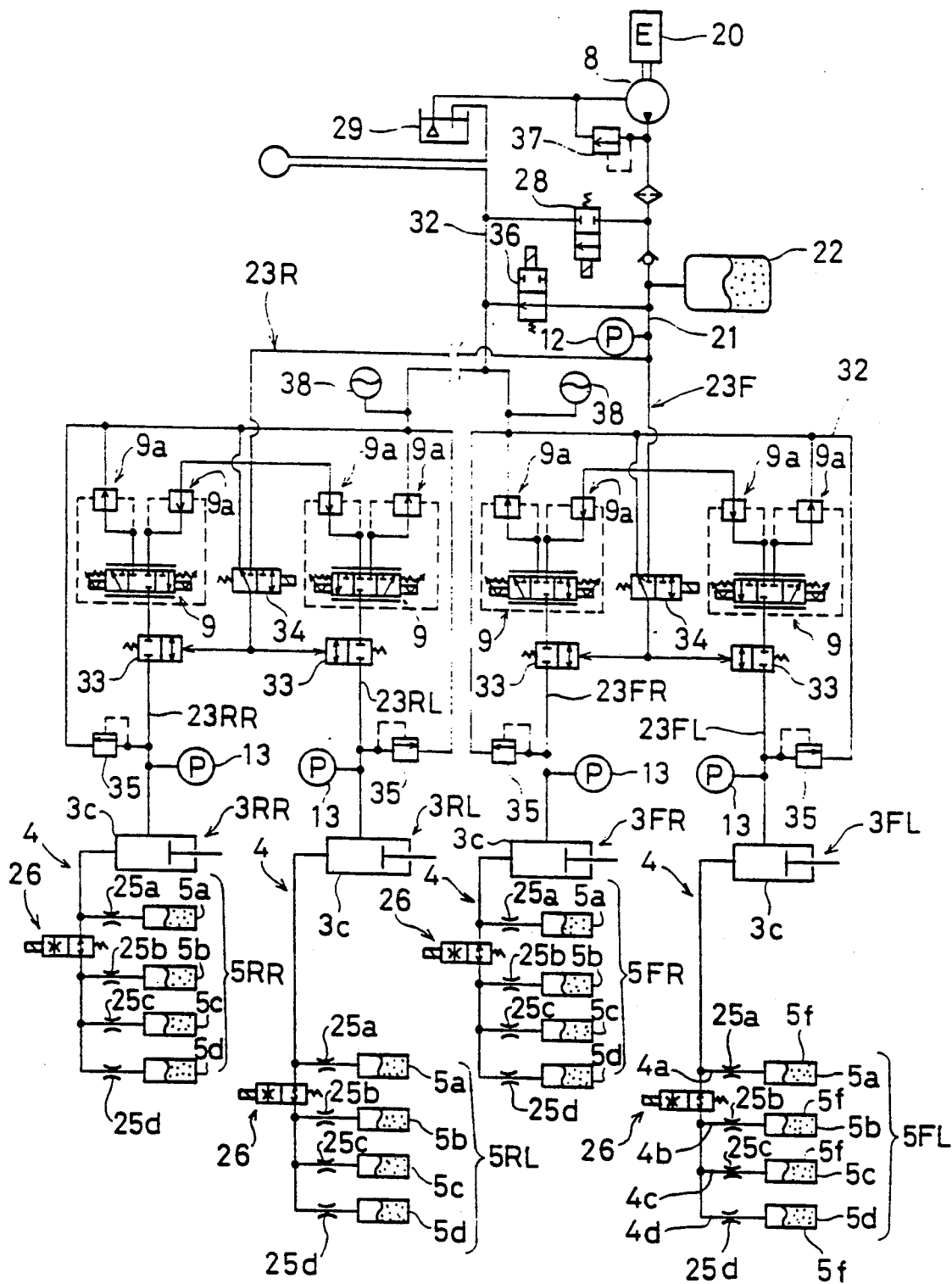
FIG. 2 is a circuit diagram showing a liquid pressure circuit for controlling the liquid cylinders.

FIG. 2 illustrates the hydraulic pressure circuit for controlling the supply or the discharge of the operating liquid to or from the liquid cylinder 3. This hydraulic pressure circuit is provided with the hydraulic pump 8 driveable by an engine 20. The hydraulic pump 8 has an accumulator 22 disposed at its discharge tube 21 which in turn is branched at its downstream portion into a piping 23F for the front wheels 2F and a piping 23R for the rear wheels 2R. The piping 23F for the front wheels 2F is further divided at its downstream portion into a left-hand branch piping 23FL for the left-hand front wheel 2FL and a right-hand branch piping 23FR for the right-hand front wheel 2FR, the left-hand branch piping 23FL being communicated with the liquid pressure chamber 3c of the corresponding liquid cylinder 3FL and the right-hand branch piping 23FR being communicated with the liquid pressure chamber 3c of the corresponding liquid cylinder 3FR. Likewise, the piping 23R is branched at its downstream portion into a left-hand branch piping 23RL for the left-hand rear wheel 2RL and a right-hand branch piping 23RR for the right-hand branch piping 23RR, the left-hand branch piping 23RL being communicated with the liquid pressure chamber 3c of the corresponding liquid cylinder 3RL and the right-hand branch piping 23RR being communicated with the liquid pressure chamber 3c of the corresponding liquid cylinder 3RR.

Each of the gas springs 5FL, 5FR, 5RL, and 5RR connected to the corresponding liquid cylinders 3FL, 3FR, 3RL, and 3RR has four gas spring members 5a, 5b, 5c and 5d. Each of the gas spring members 5a is then connected to the corresponding passage 4 through a branch passage 4a branched from the passage 4. Each of the gas spring members 5b is likewise connected to the corresponding passage 4 through a branch passage 4b which is further branched from the passage 4. Further, each of the gas spring members 5c is connected first to a branch passage 4c and then to the corresponding passage 4, the branch passage 4c being branched from the passage 4, while each of the gas spring members 5d is likewise connected to the passage 4 through a branch passage 4d branched therefrom. The branch passages 4a, 4b, 4c and 4d of the respective gas spring members 5a, 5b, 5c and 5d are provided with orifices 25a, 25b, 25c and 25d, respectively. The basic functions of the suspension apparatus are achieved by the damping action of each of the orifices 25a, 25b, 25c and 25d and the buffer action of the gas filled in the gas chamber 5f of each of the gas spring members 5a, 5b, 5c and 5d.

The passage 4 located between the first gas member 5a of each of the springs 5FL, 5FR, 5RL, and 5RR and the second gas member 5b thereof is provided with a damping-force shifting valve 26 for shifting the damping force by adjusting the passage area of the passage 4. The damping-force shifting valve 26 is so arranged as to assume two positions which include an open position in which the passage 4 is opened and a contracted position for contracting or reducing the passage area of the passage 4.

The discharge tube 21 of the hydraulic pump 8 has an unload relief valve 28 in the vicinity of the accumulator 22, and the unload relief valve 28 is so constructed as to retain the pressure-accumulating force of the operating liquid of the accumulator 22 to a set value by returning the operating liquid supplied from the hydraulic pump 8 directly to a reserve tank 29 by shifting the position of the unload relief valve 28 from its closed position, as shown in FIG. 2, to the opened position, when the discharge pressure for discharging the operating liquid detected by the discharge pressure sensor 12 indicates an upper set value or higher. This allows the operating liquid to be supplied to each of the liquid cylinder 3 in accordance with the pressure-accumulating force of the accumulator 22.

The hydraulic pressure circuit of the liquid cylinder 3 disposed to each of the wheels has the same construction, so that description which follows will be made of the hydraulic pressure circuit for the left-hand front wheel 2FL only and description of the others will be omitted herefrom for brevity of explanation.

The flow rate control valve 9 disposed on the left-hand piping 23FL for the left-hand front wheel 2FL is so constructed as to assume three positions: a closed position as shown in FIG. 2 for closing all ports, a supply position for opening the left-hand piping 23FL to the supply side, and a discharge position for communicating the left-hand piping 23FL with a return passage 32. Further, the flow rate control valve 9 has a pair of pressure compensation valve 9a which in turn are so disposed as to retain the liquid pressure of the liquid cylinder 3 to a predetermined value when the flow rate control valve 9 lies in the supply position or in the discharge position.

On the side of the liquid cylinder 3 of the flow rate control valve 9 is mounted an opening/closing valve 33 of a type capable of opening or closing the left-hand piping 23FL for the left-hand front wheel 2FL in accordance with a pilot pressure. As the pilot pressure, the liquid pressure of an electromagnetic valve 34 is introduced at the time when the electromagnetic valve 34 is opened which is mounted on the piping 23F on the front wheel side communicating with the discharge tube 21 of the hydraulic pressure pump 8. The opening/closing valve 33 allows the flow rate control valve 9 to control the supply or discharge of the operating liquid to or from the liquid cylinder 3 by opening the left-hand piping 23FL when the pilot pressure is equal to or higher than a predetermined value.

As shown in FIG. 2, reference numeral 35 denotes a relief valve for returning the operating liquid within the liquid pressure chamber 3c to the return passage 32 by opening it when the liquid pressure within the liquid pressure chamber 3c of the liquid cylinder 3 is elevated to an abnormal extent. Reference numeral 36 denotes a valve associated with an ignition key connected to the discharge tube 21 of the hydraulic pump 8 in the vicinity of the accumulator 22. This valve 23 is so arranged as to return the operating liquid accumulated within the accumulator 22 by opening the valve 23 when the ignition key is turned off, thereby releasing such a high pressure state. Reference numeral 37 denotes an in-pump relief valve for decreasing the pressure by returning the discharged liquid to the reserve tank 29 when the discharge pressure of the hydraulic pump 8 is elevated to an abnormal extent. Reference numeral 38 denotes a return accumulator disposed at the return passage 32 for accumulating the pressure when the operating liquid is discharged from the liquid cylinder 3.

Figure 3A:
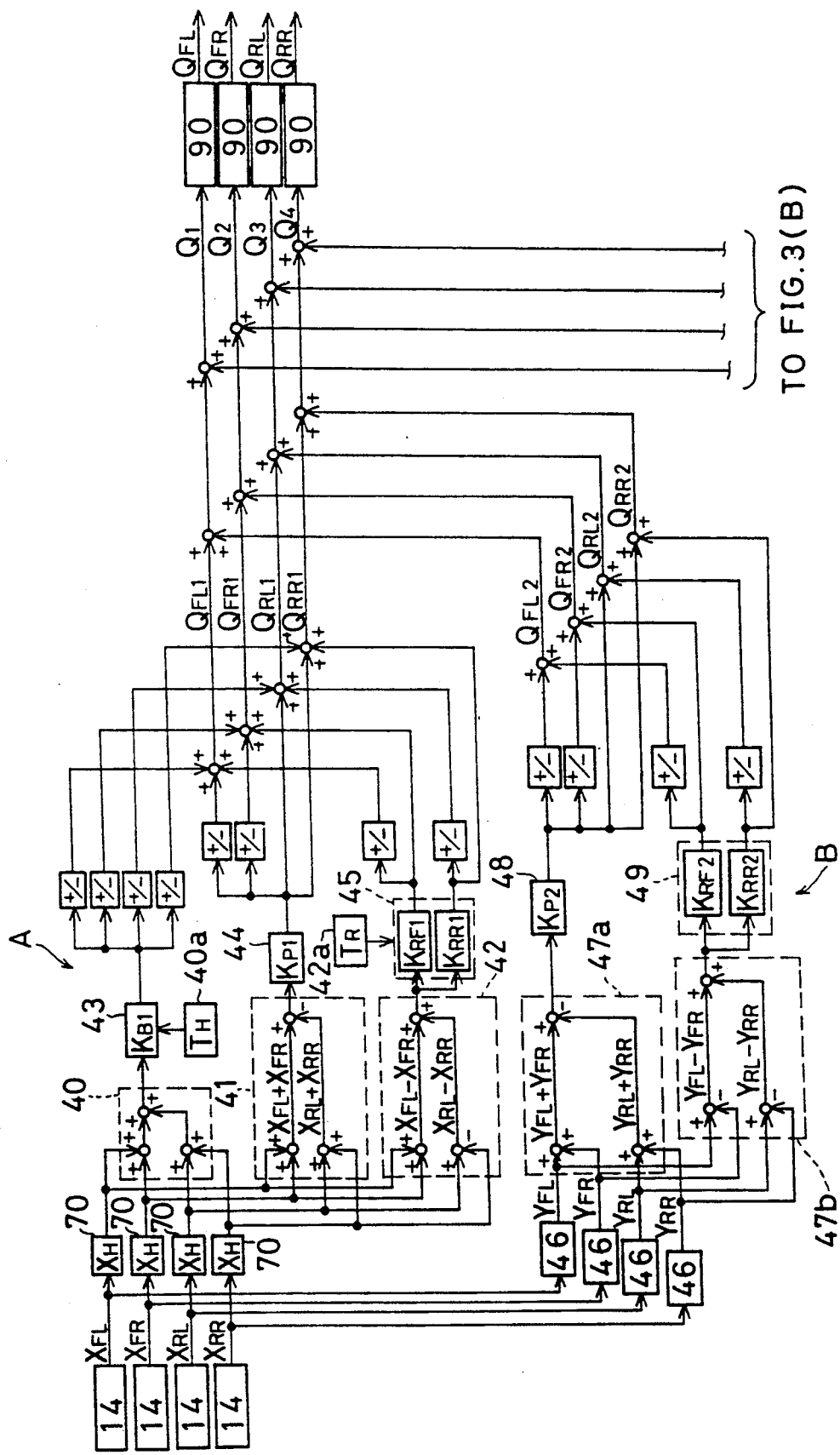
FIGS. 3(A) and (B) are block diagrams showing the control functions of suspension characteristics by the controller.

FIGS. 3(A) and 3(B) are block diagrams showing the control functions of the suspension characteristics by the controller 18. The controller 18 has a vehicle height control system A, a vehicle-height displacement velocity control system B, a vertical vibration control system C, and a vehicle body twist control system D. The vehicle height control system A is to control the vehicle height of the vehicle body to a target vehicle height thereof on the basis of signals XFL, XRL, XRL, and XRR detected by and outputted from the respective vehicle height sensors 14. The vehicle-height displacement velocity control system B is to control the velocity of displacement of the vehicle height of the vehicle body on the basis of signals YFL, YFR, YRL, and YRR, indicative of the velocity of displacement of the vehicle body, obtainable from the signals XFL, XFR, XRL, and XRR, respectively. The vertical vibration control system C is to reduce the vertical vibration of the vehicle body on the basis of signals GFL, GFR, GRL, and GRR, indicative of acceleration in the vertical direction of the vehicle body or vertical acceleration, detected by and outputted from the respective vertical acceleration sensors 15. The vehicle body twist control system D is to suppress a twist of the vehicle body on the basis of signals PFL, PFR, PRL, and PRR, indicative of the liquid pressure, detected by and outputted from the respective liquid pressure sensors 13 of the liquid cylinders 3.

The vehicle height control system A comprises a bounce component operating section 40, a pitch component operating section 41, and a roll component operating section 42. The bounce component operating section 40 is to operate the bounce component of the vehicle body by adding the sum of the signals XFL and XFR, i.e., XFL+XFR, each detected by the respective vehicle height sensors 14, indicative of the amounts of displacement of the vehicle body in the positions of the left-hand and right-hand front wheels 2FL and 2FR in which the respective vehicle height sensors 14 are mounted, to the sum of the signals XRL and XRR, i.e., XRL+XRR, each detected by the respective vehicle height sensors 14, indicative of the amounts of displacement of the vehicle body in the positions of the left-hand and right-hand rear wheels 2RL and 2RR in which the respective vehicle height sensors 14 are mounted. The pitch component operating section 41 is to operate the pitch component of the vehicle body by subtracting the sum of the signals on the rear wheel sides (XRL+XRR) from the sum of the signals on the front wheel sides (XFL+XFR). The roll component operating section 42 is to operate the roll component of the vehicle body by adding the difference of the signals on the rear wheel sides (XRL−XRR) to the difference of the signals on the front wheel sides (XFL−XFL).

In the vehicle height control system A, reference numeral 43 denotes a bounce control section for determining a control amount of the flow rate control valve 9 for each of the wheels in the bounce control on the basis of the bounce component of the vehicle body to be inputted from the bounce component operating section 40, the target average vehicle height TH to be inputted from a target average vehicle height setting section 40a, and a predetermined gain coefficient KB1. Reference numeral 44 denotes a pitch control section for determining a control amount for each of the flow rate control valves 9 in the pitch control on the basis of the pitch component of the vehicle body to be inputted from the pitch component operating section 41 and a predetermined gain coefficient KP1. Further, reference numeral 45 denotes a roll control section for determining a control amount of each flow rate control valve 9 in the roll control so as to allow the actual vehicle height to give a value corresponding to a target roll displacement amount setting section 42a on the basis of the roll component of the vehicle body to be inputted from the roll component operating section 42, the target roll component displacement amount TR to be inputted from the target roll displacement amount setting section 42a, and predetermined gain coefficients KRF1 and KRR1.

Each of the control amounts produced by the respective control sections 43, 44 and 45 is inverted from its positive number to its negative number or vice versa for each wheel. Thereafter, the bounce, pitch and roll components for each of the wheels 2FL, 2FR, 2RL and 2RR are added to each other and the resulting sums are outputted as control signals QFL1, QFR1, QRL1, and QRR1 of the control system A for controlling displacement of the vehicle height. Between each of the vehicle height sensors 14 and the bounce component operating section 40, the pitch component operating section 41, and the roll component operating section 42, there is provided a device 70 for outputting a signal only when each of the detected signals XFL, XFR, XRL and XRR detected by the respective vehicle height sensors 14 exceeds an unreactive zone XH.

The vehicle-height displacement velocity control system B is so constructed as to carry out the control in order to reduce the velocity of displacing the vehicle height and comprises a differentiator 46 for carrying out control so as to reduce the velocity of displacement of the vehicle height, a pitch component operating section 47a and a roll component operating section 47b. The differentiator 46 is to produce vehicle-height displacing velocity signals YFL, YFR, YRL and YRR by differentiating the detected signals XFL, XFR, XRL and XRR outputted from the respective vehicle height sensors 14. The pitch component operating section 47a is to operate the pitch component of the vehicle body by subtracting the sum of the vehicle-height displacement velocity signals on the front wheel side, i.e. XRL+XRR, from the sum of the vehicle-height displacement velocity signals on the rear wheel side, i.e. XFL+XFR. The roll component operating section 47b is to operate the roll component of the vehicle body by adding the difference of the vehicle-height displacement velocity signals on the rear wheel side, i.e. XRL−XRR, to the difference of the vehicle-height displacement velocity signals on the front wheel side, i.e. XFL−XFR.

In the vehicle-height displacement velocity control system B, reference numeral 48 denotes a pitch control section for determining a control amount of each of the flow rate control valves 9 in the pitch control on the basis of a pitch component of the vehicle body to be inputted from the pitch component operating section 47a and a predetermined gain coefficient KP2, reference numeral 49 denotes a roll control section for determining a control amount of each of the flow rate control valves 9 in the roll control on the basis of a roll component of the vehicle body to be inputted from the roll component operating section 47b and predetermined gain coefficients KRF2 and KRR2. As needed, the positive number or the negative number of the pitch and roll control amounts produced by the respective control sections 48 and 49 is inverted into the opposite number, and the resulting numbers are added to each other and thereafter the pitch and roll components for each of the wheels 2FL, 2FR, 2RL and 2RR are outputted as control signals QFL2, QFR2, QRL2, and QRR2 of the control system B for controlling displacement of the vehicle height.

The vertical vibration control system C is so constructed as to carry out the control so as to make the acceleration acting upon the vehicle body smaller and comprises a bounce component operating section 50, an average operating section 51a, a pitch component operating section 51, and a roll component operating section 52. The bounce component operating section 50 is to determine the bounce component of the vehicle body by totalling the detected signals GFL, GFR, and GR detected by the respective vertical acceleration sensors 15. The average operating section 51a is to determine the average of the detected signals GFL and GFR detected by the vertical acceleration sensors 15 on the side of the front wheels 2F. The pitch component operating section 51 is to determine the pitch component of the vehicle body by subtracting the value of the detected signal GR detected by the sensor 15 located on the rear wheel side from the average determined by the average operating section 51a. The roll component operating section 52 is to determine the roll component of the vehicle body by subtracting the value of the detected signal GFR detected by the sensor 15 located on the right-hand front wheel side from the value of the detected signal GFL detected by the sensor 15 located on the left-hand front wheel side.

In the vertical acceleration control system C, reference numeral 53 denotes a bounce control section for determining a control amount of the flow rate control valve 9 for each of the wheels in the bounce control on the basis of the bounce component of the vehicle body to be inputted from the bounce component operating section 50, and a predetermined gain coefficient KB3. Reference numeral 54 denotes a pitch control section for determining a control amount for each of the flow rate control valves 9 in the pitch control on the basis of the pitch component of the vehicle body to be inputted from the pitch component operating section 51 and a predetermined gain coefficient KP3. Further, reference numeral 55 denotes a roll control section for determining a control amount of each flow rate control valve 9 in the roll control on the basis of the roll component of the vehicle determined by the roll component operating section 52 and predetermined gain coefficients KRL3 and KRR3.

As needed, the positive number or the negative number of each of the respective bounce, pitch and roll control amounts determined by the respective control sections 53, 54 and 55 is inverted to the opposite number. Thereafter, the bounce, pitch and roll components for each of the wheels 2FL, 2FR, 2RL and 2RR are added to each other and the resulting sums are outputted as control signals QFL3, QFR3, QRL3, and QRR3 of the control system C for controlling the vertical vibration of the vehicle body. Between each of the vertical acceleration sensors 15 and the bounce component operating section 50, the pitch component operating section 51, and the roll component operating section 52, there is provided each a device 80 for outputting a signal only when the detected signals GFL, GFR, and GR detected by the respective vertical acceleration sensors 15 exceed a predetermined unreactive zone XG.

The control system D for suppressing the twist of the vehicle body has a warp control section 60 consisting of liquid pressure ratio operating sections 60a and 60b. The liquid pressure ratio operating section 60a is to operate a ratio of the sum of the liquid pressure values, i.e. PFL+PFR, to the difference of the liquid pressure values, i.e. PFL−PFR, in accordance with the detected signals PFL and PFR detected by the liquid pressure sensors 13 disposed on the side of the front wheels 2F. The liquid pressure ratio operating section 60b is to operate a ratio of the sum of the liquid pressure values, i.e. PRL+PRR, to the difference of the liquid pressure values, i.e. PRL−PRR, in accordance with the detected signals PRL and PRR detected by the liquid pressure sensor 13 disposed on the side of the rear wheels 2R.

Thereafter, the value obtained by multiplying the liquid pressure ratio determined by the liquid pressure ratio operating section 60b on the side of the rear wheels 2R with a gain coefficient WF is subtracted from the liquid pressure determined by the liquid pressure ratio operating section 60a disposed on the side of the front wheels 2F. The value obtained by multiplying the resulting difference with a gain coefficient WA is then multiplied with a gain coefficient WC. Thereafter, one of the positive or negative number of the front wheels 2F is inverted into the opposite number, and there is determined a control amount on the front wheel side in the warp control for suppressing the twist of the vehicle body. At the same time, by inverting one of the positive or negative number of the front wheels 2R to the opposite number without multiplication with the gain coefficient WC, a control amount on the side of the rear wheels 2R is determined, thereby outputting control signals QFL4, QFR4, QRL4, and QRR4 corresponding to the respective control amounts.

Then, by adding the vehicle-height displacement components QFL1, QFR1, QRL1 and QRR1, the vehicle-height displacement velocity components QFL2, QFR2, QRL2 and QRR2, the vertical acceleration components QFL3, QFR3, QRL3 and QRR3, and the pressure components QFL4, QFR4, QRL4 and QRR4, respectively, there are given total control amounts Q1, Q2, Q3 and Q4 for each wheel. The total control amount Qn (where n is 1 to 4) is then outputted to an actuator consisting of the flow rate control valve 9 through a low pass filter 90, thereby controlling the flow rate of the operating liquid for the liquid cylinder 3 in accordance with the running state of the vehicle body.

The low pass filter 90 is so constructed as to vary a gain of each of control signals QFL, QFR, QRL and QRR to be outputted to the respective flow rate control valves 9 from the controller 18 in accordance with a frequency and amplitude of vibration acting upon the vehicle body, by multiplying the total control amount Qn with a value expressed by a time coefficient QnKn and a Laplace's operator s, $\{1/(1+QnKn \times s)\}$. The low pass filter 90 may be composed of a circuit element disposed independently and separately and, in this embodiment, it is so constructed as to allow the central processing unit (CPU) of the controller 18 to compute the following value: $\{1/(1+QnKn \times s)\}$.

The Laplace's operator s gets larger as the frequency of vibration gets larger, so that the denominator of the value $\{1/(1+QnKn \times s)\}$ increases as the frequency increases. Hence, the gain of an input/output signal of the low pass filter 90 is so arranged as to be reduced gradually in accordance with an increase in the frequency.

The time constant QnKn of the low pass filter 90 is constructed as the multiplication of the predetermined gain constant Kn with the total control amount Qn that increases as the amplitude of vibration acting upon the vehicle body increases, so that both of the time constant QnKn and the denominator $\{1/(1+QnKn \times s)\}$ get larger when a large degree of vibration acts upon the vehicle body, thereby making the gain of the input/output signal for the low pass filter 90 smaller.

Figure 4:
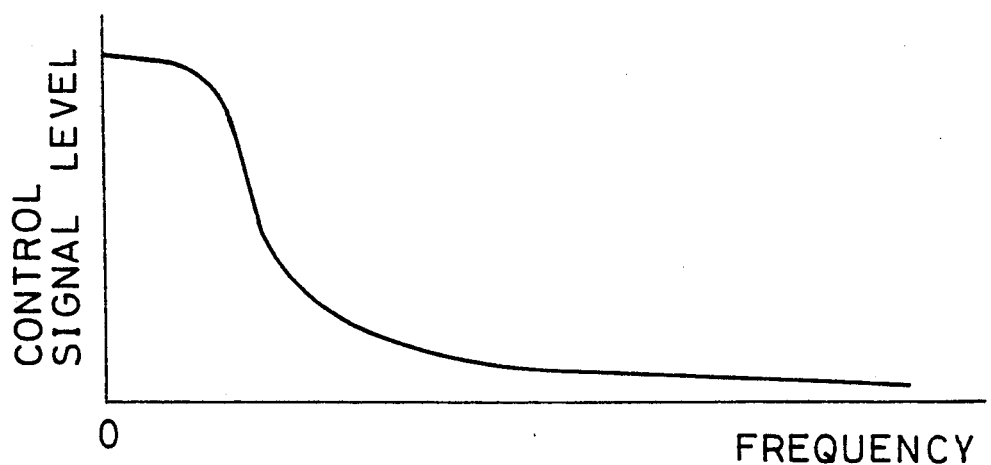
FIGS. 4 and 5 show relatively large levels of total control signals QFL, QFR, QRL and QRR from low pass filter 90 in a low frequency region.

When the amplitude of vibration acting upon the vehicle body in the aforesaid construction is large, the total control amount Qn to be inputted into the low pass filter 90 is large, too, so that the levels of the control signals QFL, QFR, QRL and QRR to be eventually outputted from the low pass filter 90 become as large as shown in FIG. 4 in a low frequency region. When the Laplace's operator s gets larger as the frequency increases, both of the terms Qn and s in the denominator $\{1/(1+QnKn \times s)\}$ indicative of the gain of the low pass filter 90 get larger while the gain of the low pass filter 90 decreases rapidly, thereby the levels of the control signals QFL, QFR, QRL and QRR decrease with a sharp gradient in accordance with an increase in the frequency.

Figure 5:
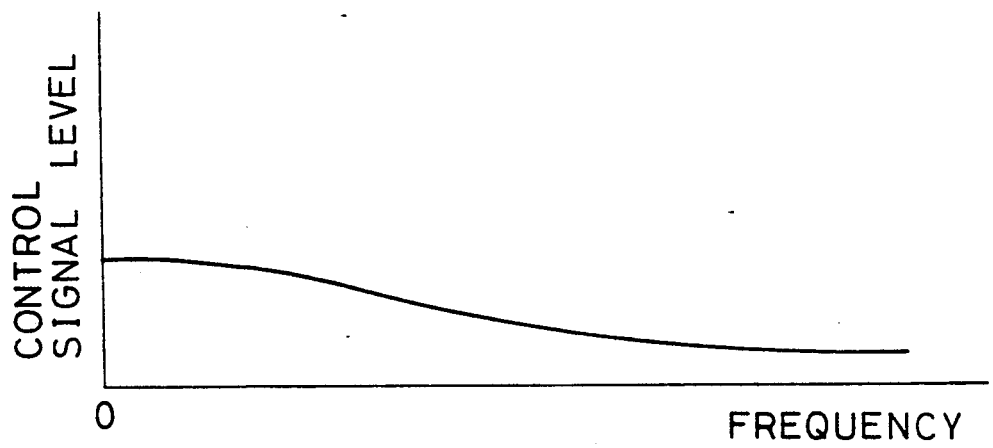

On the other hand, when the amplitude of vibration is small, the total control amount Qn is so small that the levels of the control signals QFL, QFR, QRL and QRR in a low frequency region become as small as shown in FIG. 5. The gain of the low pass filter 90 does not rapidly decrease so much even if the frequency of vibration would increase, so that the rate at which the control signals QFL, QFR, QRL and QRR are decreased in accordance with an increase in the frequency becomes smaller as compared with a large amplitude.

As described hereinabove, the suspension apparatus for the vehicle according to the present invention is so constructed as to generate the control signals QFL, QFR, QRL and QRR to the actuators through the low pass filters 90, the control signals corresponding to the respective total control amounts Qn for the actuators consisting of the flow rate control valves 9 operating the liquid cylinders 3, which in turn are determined by the control means consisting of the control systems A, B, C and D, in accordance with the detected signals detected by the detecting means for detecting the running state of the vehicle, such as the liquid pressure sensors 13, the vehicle height sensors 14 and the vertical acceleration sensors 15 of the liquid cylinders 3. In the suspension apparatus according to the present invention, the time constant of the low pass filter 90 is so set as to vary with the total control amount Qn and as to become larger as the total control amount Qn gets larger, so that the state of operating the liquid cylinder 3 is appropriately controlled in accordance with the running state of the vehicle, thereby maintaining the running stability and comfort in a good state.

More specifically, in instances where the amplitude of vibration acting upon the vehicle body is large, the time constant of the low pass filter 90 becomes so large that the rate of decreasing the gain of the low pass filter 90 becomes large, which decreases in accordance with an increase in frequency, and the levels of the control signals QFL, QFR, QRL and QRR are rapidly decreased in a high frequency region. Therefore, the phenomenon of oscillation resulting from a delay in response in a particular high-frequency region is prevented from occurring, thereby preventing a reduction in driving comfort.

Figure 6:
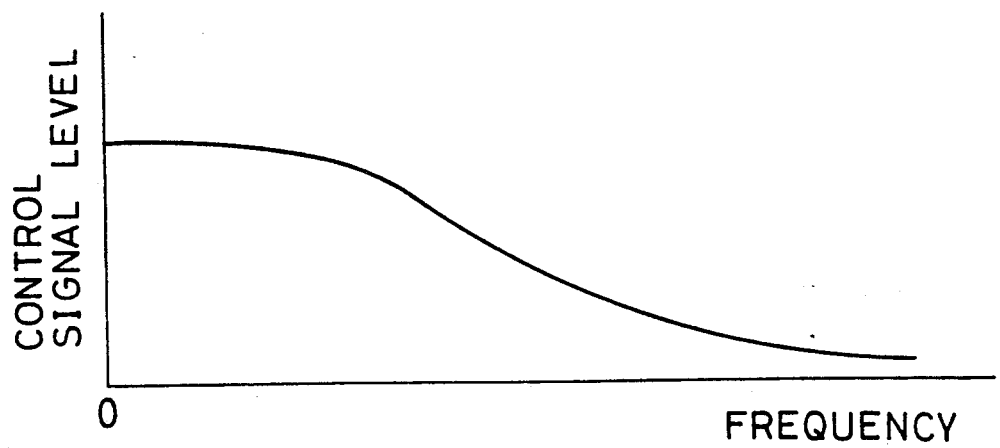
FIG. 6 shows a considerably higher control signal value incurring the risk of causing oscillation, when the value of control amount Qn is excluded from the denominator of the low pass filter.

If the total control amount Qn is excluded from the value $\{1/(1+QnKn\times s)\}$, i.e., if the denominator becomes $\{1/(1+Kn\times s)\}$, the levels of the total control signals QFL, QFR, QRL and QRR becomes considerably high as shown in FIG. 6 in a high frequency region, thereby incurring the risk of causing oscillation.

It is to be understood that the foregoing text and drawings relate to embodiments of the invention given by way of examples but not limitation. Various other embodiments and variants are possible within the spirit and scope of the present invention.

What is claimed is:

1. A suspension apparatus of a vehicle having a liquid cylinder disposed between a member on the side of a vehicle body and a member on the side of each wheel and an actuator for supplying or discharging an operating liquid to or from a liquid pressure chamber of the liquid cylinder disposed so as to alter a suspension characteristic by controlling the actuator, comprising:
    a running-state detecting means for detecting a running state of the vehicle;
    a control means for determining a control amount for the actuator on the basis of a predetermined condition in accordance with a signal detected by and outputted from the running-state detecting means; and
    a low pass filter for reducing a gain of the control amount determined by the control means in a high frequency region;
    wherein a time constant of the low pass filter is so set as to become larger as the control amount determined by the control means gets larger.

2. A suspension apparatus as claimed in claim 1, wherein:
    the running-state detecting means is to detect a vehicle height of the vehicle body in a position in which each wheel is located; and
    the control means determines the control amount for a posture of the vehicle body according to the position of each wheel to assume a predetermined posture.

3. A suspension apparatus as claimed in claim 2, wherein:
    the posture of the vehicle body is determined by three components including a bounce component, a pitch component and a roll component; and
    the control means is to determine the control amount for each of the three components.

4. A suspension apparatus as claimed in claim 2, wherein:
    the running-state detecting means detects a velocity of displacing the vehicle height of the vehicle body; and
    the control means further comprises a second control means for determining a control amount so as to make the velocity of displacing the vehicle height thereof smaller.

5. A suspension apparatus as claimed in claim 4, wherein:
    the velocity of displacing the vehicle height thereof is determined by two components including the pitch component and the roll component; and
    the second control means is to determine the control amount for each of the two components.

6. A suspension apparatus as claimed in claim 4, wherein:
    the running-state detecting means is further to detect vertical acceleration acting upon the vehicle body; and
    the control means further comprises a third control means for determining a control amount so as to suppress the vertical acceleration acting upon the vehicle body.

7. A suspension apparatus as claimed in claim 6, wherein:
    the actuator is to adjust a flow rate of the operating liquid;
    the running-state detecting means is to detect a twisting force acting upon a position between a forward portion and a rearward portion of the vehicle body; and
    the control means is to determine a control amount so as to suppress the twisting force acting upon the position between the forward portion and the rearward portion thereof.

8. A suspension apparatus as claimed in claim 7, wherein:
    the running-state detecting means comprises a pressure detecting means for detecting an inner pressure of each liquid cylinder; and
    the running-state detecting means is to detect the twisting force on the basis of the inner pressure detected by the pressure detecting means.

9. A suspension apparatus as claimed in claim 1, wherein the low pass filter generates a signal Q to be determined by the following formula:

$$Q = Qn \times \frac{1}{Qn \times Kn \times s + 1}$$

wherein
    Qn is the control amount determined by the control means;
    Kn is a gain coefficient; and
    s is a Laplace's operator.

10. A suspension apparatus as claimed in claim 9, wherein the Laplace's operator s is so set as to become larger as a frequency of vibration gets larger.

11. A suspension apparatus of a vehicle having a liquid cylinder disposed between a member on the side of a vehicle body and a member on the side of each wheel and an actuator for supplying or discharging an operating liquid to or from a liquid pressure chamber of the liquid cylinder disposed so as to alter a suspension characteristic by controlling the actuator, comprising:
    a plurality of vehicle-height detecting means for detecting a vehicle height of the vehicle body in a position in which each wheel is located;

a displacement velocity determining means for determining a velocity of displacing the vehicle height thereof by differentiating the vehicle height thereof detected by the vehicle-height detecting means;

a first control means for determining a control amount for the actuator for each of three components including a bounce component, a pitch component and a roll component of the vehicle body in response to output from the vehicle-height detecting means;

a second control means for determining a control amount so as to make the velocity of displacing the vehicle height thereof smaller for two components including the pitch component and the roll component thereof, in response to output from the displacement velocity determining means;

an addition means for determining a total control amount for the actuator by adding the control amount determined by the first control means to the control amount determined by the second control means; and a low pass filter for reducing a gain of the total control amount determined by the addition means in a high frequency region;

wherein a time constant of the low pass filter is so set as to become larger as the total control amount determined by the addition means gets larger.

12. A suspension apparatus as claimed in claim 11, further comprising:

a plurality of vertical acceleration detecting means for detecting vertical acceleration acting upon the vehicle body; and a third control means for determining a control amount for the actuator so as to make the vertical acceleration smaller for each of the bounce component, pitch component and roll component of the vehicle body, in response to output from the vertical acceleration detecting means;

wherein the addition means is to determine a total control amount by adding the control amount determined by the first control means, the control amount determined by the second control means and the control amount determined by the third control means.

13. A suspension apparatus as claimed in claim 12, wherein:

the actuator is of a type adjusting a flow rate of the operating liquid; and the control amounts determined by the first control means, the second control means and the third control means are determined as flow rate values.

14. A suspension apparatus as claimed in claim 13, further comprising:

a plurality of pressure detecting means for detecting an inner pressure of each liquid cylinder; and a fourth control means for determining a control amount for the actuator as a flow rate value so as to suppress a twisting force acting upon a position between a forward portion and a rearward portion of the vehicle body, in response to output from the pressure detecting means;

wherein the addition means is to determine a total control amount by adding the control amount determined by the first control means, the control amount determined by the second control means, the control amount determined by the third control means, and the control amount determined by the fourth control means.

15. A suspension apparatus as claimed in claim 11, further comprising an unreactive-zone setting means for setting an unreactive zone which is unreactive to an output signal from the vehicle-height detecting means.

16. A suspension apparatus as claimed in claim 12, further comprising an unreactive-zone setting means for setting an unreactive zone which is unreactive to an output signal from the vertical acceleration detecting means.

17. A suspension apparatus as claimed in any one of claims 11 to 16, wherein the low pass filter generates an output signal Q to be determined by the following formula:

$$Q = Qn \times \frac{1}{Qn \times Kn \times s + 1}$$

Where
Qn is the control amount to be determined by the control means;
Kn is a gain coefficient; and
s is a Lapalace's operator.

* * * * *